United States Patent
Morfino

(10) Patent No.: US 9,519,282 B2
(45) Date of Patent: Dec. 13, 2016

(54) METHOD FOR MOVING A TOOL OF A CNC MACHINE OVER A SURFACE

(75) Inventor: Giuseppe Morfino, Pino Torinese (IT)

(73) Assignee: FIDIA S.P.A. (IT)

( * ) Notice: Subject to any disclaimer, the term of this patent is extended or adjusted under 35 U.S.C. 154(b) by 880 days.

(21) Appl. No.: 13/039,080

(22) Filed: Mar. 2, 2011

(65) Prior Publication Data

US 2011/0218668 A1 Sep. 8, 2011

(30) Foreign Application Priority Data

Mar. 5, 2010 (EP) .................................. 10002317

(51) Int. Cl.
*G05B 19/416* (2006.01)
*G05B 19/401* (2006.01)
*G05B 19/404* (2006.01)

(52) U.S. Cl.
CPC ......... *G05B 19/4163* (2013.01); *G05B 19/401* (2013.01); *G05B 19/404* (2013.01); *G05B 2219/35159* (2013.01); *G05B 2219/36503* (2013.01); *G05B 2219/49061* (2013.01); *G05B 2219/49066* (2013.01); *G05B 2219/49069* (2013.01); *G05B 2219/49186* (2013.01); *G05B 2219/49362* (2013.01)

(58) Field of Classification Search
CPC . G05B 19/4163; G05B 19/401; G05B 19/404; G05B 2219/35159; G05B 2219/49362; G05B 2219/49186; G05B 2219/49061; G05B 2219/49066; G05B 2219/49069; G05B 2219/36503
USPC ........ 700/159, 160, 165, 173, 175, 192, 206
See application file for complete search history.

(56) References Cited

U.S. PATENT DOCUMENTS

| 4,568,816 | A | * | 2/1986 | Casler, Jr. | .......... G05B 19/4083 |
| | | | | | 219/124.34 |
| 4,967,365 | A | | 10/1990 | Hampl et al. | |
| 5,006,999 | A | * | 4/1991 | Kuno et al. | ................... 700/253 |
| RE34,602 | E | * | 5/1994 | Naito et al. | ..................... 83/49 |

(Continued)

FOREIGN PATENT DOCUMENTS

| DE | 102 43 415 A1 | 4/2004 |
| EP | 0 349 291 A2 | 1/1990 |

(Continued)

OTHER PUBLICATIONS

Extended European Search Report Dated Oct. 6, 2010, Application No. 10002317.5-1239,7 Pages.

(Continued)

*Primary Examiner* — Nathan L Laughlin
(74) *Attorney, Agent, or Firm* — Brooks Kushman P.C.

(57) ABSTRACT

A method for moving a tool of a CNC machine over a surface, wherein the CNC machine is provided with a sensor unit, comprising the steps of: (a) moving the tool over the surface in a predetermined direction and/or with a predetermined velocity and/or along a predetermined path, (b) treating the surface by the tool in accordance with a predetermined value of a treatment parameter, (c) determining, by the sensor unit, a response value indicating a response of the tool to treating the surface and/or to being pressed to the surface, and (d) determining a new direction and/or a new velocity and/or a new path and/or a new value for the treatment parameter based on the response value.

20 Claims, 5 Drawing Sheets

(56) References Cited

U.S. PATENT DOCUMENTS

| | | | | |
|---|---|---|---|---|
| 5,387,061 | A * | 2/1995 | Barkman | B23Q 17/24 318/568.1 |
| 5,761,390 | A | 6/1998 | Koshishiba et al. | |
| 6,161,055 | A * | 12/2000 | Pryor | G05B 19/4065 382/152 |
| 6,189,364 | B1 * | 2/2001 | Takada | 72/702 |
| 6,225,589 | B1 * | 5/2001 | Bartok | B23H 7/265 219/69.15 |
| 6,256,546 | B1 * | 7/2001 | Graham | G05B 19/4099 700/29 |
| 6,386,008 | B1 * | 5/2002 | Virtanen et al. | 72/19.8 |
| 2001/0012973 | A1 * | 8/2001 | Wehrli | B23Q 17/22 700/193 |
| 2007/0050064 | A1 | 3/2007 | Burgess et al. | |
| 2008/0083714 | A1 * | 4/2008 | Kamath et al. | 219/121.57 |
| 2008/0105094 | A1 * | 5/2008 | McMurtry | B23Q 15/12 82/118 |
| 2008/0308199 | A1 | 12/2008 | Locker | |
| 2009/0158805 | A1 * | 6/2009 | Callebaut | B21D 31/005 72/342.5 |
| 2009/0198369 | A1 * | 8/2009 | Xu et al. | 700/173 |
| 2009/0312862 | A1 * | 12/2009 | Fagan | 700/160 |
| 2011/0033254 | A1 * | 2/2011 | Abrams | B23Q 17/22 408/1 R |
| 2011/0118751 | A1 * | 5/2011 | Balaji | A61B 17/32 606/130 |
| 2011/0210110 | A1 * | 9/2011 | Dearman et al. | 219/137 R |

FOREIGN PATENT DOCUMENTS

| | | |
|---|---|---|
| EP | 1 132 789 A2 | 9/2001 |
| WO | 88/05524 A1 | 7/1988 |
| WO | 2004/033147 A2 | 4/2004 |
| WO | 2007/016919 A1 | 2/2007 |
| WO | 2007/060284 A1 | 5/2007 |

OTHER PUBLICATIONS

Festklopfverfahren—Hammern Bis Zum Glanz, Mar. 2007, p. 36.
Entwicklung zur ultraschallunterstutzten Bearbeitung, Zwie neue Projekte am IfP, von Michael Schneeweiss, Published prior to Mar. 2, 2010, 1 page.

* cited by examiner

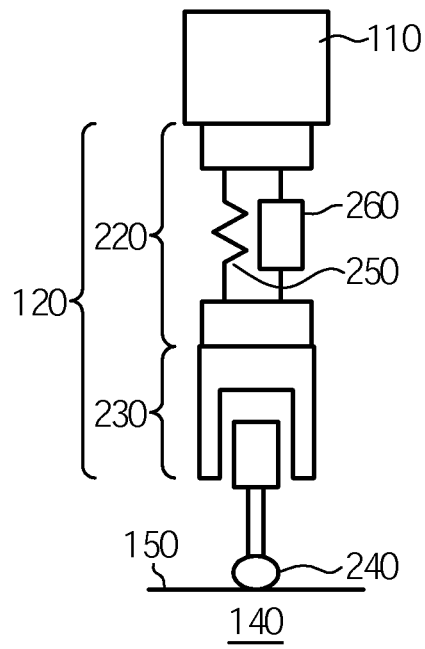
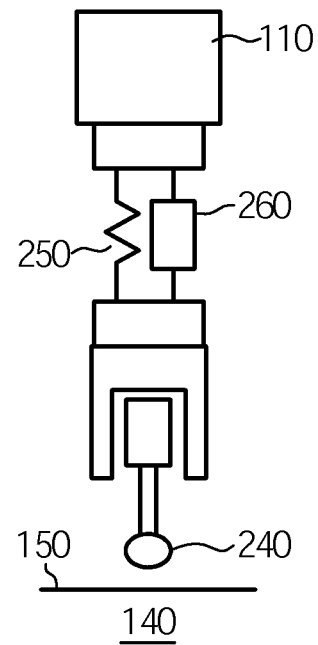
FIG. 2a  FIG. 2b
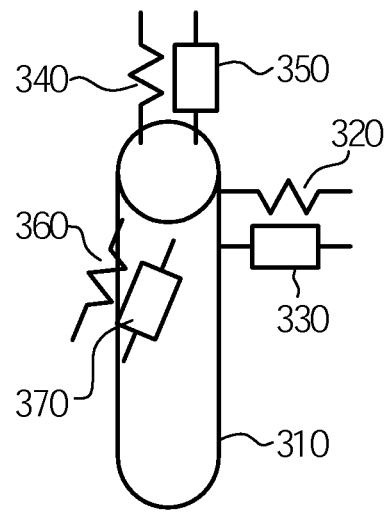
FIG. 3

METHOD FOR MOVING A TOOL OF A CNC MACHINE OVER A SURFACE

CROSS-REFERENCE TO RELATED APPLICATIONS

This application claims foreign priority benefits under 35 U.S.C. §119(a)-(d) to European patent application number EP 10002317.5, filed Mar. 5, 2010, which is incorporated by reference in its entirety.

TECHNICAL FIELD

The present disclosure is directed to a method for moving a tool of a computer numerical control (CNC) machine over a surface.

BACKGROUND

While a tool is moved over the surface of a part by a CNC machine, the tool is, in general, performing some kind of treating on the part. The result of the treatment is dependent on treating the surface under optimal conditions, like treating the surface under predetermined angles and in preferred directions associated with the structure of the material. To achieve good results for treating, a preferred path for moving the tool during treating is defined based on a model of the shape of the surface as it is expected to be formed based on theoretical considerations.

However, if the part has undergone steps of treatment before, some wear may have occurred which has the consequence that the actual shape of the part to be processed is somewhat different from its theoretical shape. So, following the preferred path for further treating the surface leads to working on the surface in positions, directions and/or under angles which differ from the ones planned for optimal treatment. Particularly near ranges with large curvatures, like edges, the differences between the planned and the actual working conditions for the tool may be considerable.

To obtain a better adaptation of the treatment to the actual shape of the surface of the part, the system disclosed by WO 2007/016919 teaches determining optimal paths for moving the tool, based on geometry data of the desired 3D surface and of the tool. The disclosed system may be combined with a mechanical or non-contact measurement process (like a LASER measurement) to obtain intelligent and autonomous processing of the surface. 3D-shapes of the surface, tolerances as well as roughness and resistance of the surface are taken from the drawing program and performed by the disclosed system.

Moreover, the article "Hämmern bis zum Glanz", werkzeug & formenbau, March 2007, page 36, mentions a method of hammering a surface where, after having exchanged a previous tool against a hammer tool and keeping the part in its mounting for further treatment, the CAM-system can apply a correction to the preferred path of the tool, based on the existing CAM program.

However, in both cases, the tool is moved along a path, derived from existing geometry data or an existing CAM program, before treating the surface. The CNC machine according to the prior art is not provided with a possibility of changing the direction of moving the tool over the surface to preserve optimal working conditions, in particular, working under optimal angles and/or in optimal directions, if differences between the theoretical and the actual shape of the surface are detected during treatment. So, in the case of differences between theoretical and actual shape, e.g. caused by wear of a part during former production steps, processing the surface is performed, according to the prior art, along a predetermined path which is optimized based on predetermined conditions, but is not adapted to the actual shape of the surface. Particularly, WO2007/016919 does not provide any further explanation of what is measured and how the measurement is accomplished. Moreover, WO2007/016919 does not specify in which way the additional measurement process may be employed to obtain better treatment results.

SUMMARY

A way of changing the direction of movement over the surface to follow a different path which is better adapted to the actual shape of the surface in reaction to a response of the tool determined during treating of the surface is not disclosed in the prior art.

In addition, determining the actual shape of the surface based on measurement values obtained by an additional tracking device (like a LASER) implies the danger of introducing measurement errors involved by an offset between the point where the tool treats the surface, and the point where measurement is carried out.

Hence, there is a need for a method of moving a tool of a CNC machine over a surface which provides an optimized result for processing the surface.

The present disclosure provides a method, a CNC machine, a CNC machine controller and a computer program product that solve the above problem.

In particular, the present disclosure provides a method for moving a tool of a CNC machine over a surface, wherein the CNC machine is provided with a sensor unit, the method comprising the steps of:

(a) moving the tool over the surface in a predetermined direction and/or with a predetermined velocity and/or along a predetermined path, (b) treating the surface by the tool, (c) determining, by the sensor unit, a response value indicating a response of the tool to treating the surface and/or to being pressed to the surface, (d) determining a new direction and/or a new velocity and/or a new path based on the response value.

Changing the path based on the actual shape of the surface as determined during processing can provide a way of moving the tool over the surface wherein it is oriented to the surface in a way which is better suited for treating the surface in its actual shape.

In addition, determining the actual shape of the surface based on measurement values by a response of the tool itself instead of a response of an additional tracking or measurement device avoids the danger of systematic measurement errors involved by an offset between the point where the tool treats the surface, and the point where measurement is carried out. Thus, the basis for a more accurate measurement of the actual surface is provided by the method.

The CNC machine may be a robot.

Step (b) may be carried out in accordance with a predetermined value of a treatment parameter. The value of the treatment parameter may describe in which way step (b) is executed. In addition or alternatively to step (d), a new value for a treatment parameter may be determined. There may be more than one treatment parameter.

This method includes the feature of determining a new direction and/or a new path for moving the tool, based on the determination of a response to treating the surface with the tool. So, treating the surface can be adapted to the actual working conditions that are encountered by the tool. In the case of treating the surface under a non-optimal angle or in an unfavourable direction (which may be reflected by unexpected responses to treating the surface), the method offers the possibility of changing the direction of movement over the surface and/or changing the path of the tool to obtain treating conditions which are better adapted to the actual shape of the surface. In particular, the direction of moving the tool over the surface may be changed to move the tool along a path where the curvature of the actual surface is lower than along a predetermined path. So, the method of claim 1 provides an optimized result for processing the actual surface of a part.

Step (a) and step (b) may be performed simultaneously. Alternatively, step (a) and step (b) may be performed at different time intervals. In particular, there may be time intervals where the tool is moved over the surface without treating the surface, and other time intervals where the surface is treated without moving the tool over the surface. Those time intervals may be alternating.

The steps (a) of moving the tool and (b) of treating the surface are adapted with respect to the surface by performing the determining step (d). The new values determined in step (d) may be the predetermined values in step (a) and/or in step (b).

Step (a) may be performed at the same time as step (b), or step (a) may be performed alternately with step (b). Steps (a) and (b) may be performed several times, in particular, more than one time, before step (c) and (d) are carried out.

The method may be carried out several times subsequently. The new direction and/or new velocity and/or new path and/or new value for a treatment parameter of step (d), which have been determined while the method has been carried out at a first time, may be used as predetermined values when the method is carried out at a second time, wherein the second time is later than the first time. Between the first time and the second time, the method may be carried out one or more times. Alternatively, between the second time and the first time, steps (a) and/or (b) may be carried out several times.

In this way, steps (a) and/or (b) may be adapted to the determined response of the surface to the treatment.

The tool may be any of the kinds of tool which are used in connection with CNC machines. In particular, the tool may be a hammer, a drill, a cutter or a planer. The operation of treating the surface may correspond to the employed tool. In particular, treating the surface may be hammering, polishing, planishing, smoothing, cutting or drilling.

The new direction, new velocity and new path mentioned in step (d) may be new with respect to the predetermined direction, predetermined velocity and predetermined path referenced in step (a). The new value for a treatment parameter in step (d) may be new with respect to the predetermined treatment parameter referenced in step (b).

Step (d) may be based on treatment rules specifying how to determine a new direction and/or a new velocity and/or a new path and/or a new value specifying how to treat the surface by the tool based on a response value determined in step (c).

Step (d) may be based on a model of the surface.

Alternatively or in addition, in step (d), the determined direction and/or the determined velocity and/or the determined path and/or the determined value of the treatment parameter may be determined based on a model of the surface.

The model of the surface may comprise coordinates of locations on the surface, in particular, three-dimensional coordinates. For at least a part of the surface, the model may comprise data of directions, of velocities and/or of values of a treatment parameter which are associated with locations in at least the part of the surface. The model of the surface may comprise a mathematical formula and/or parameters of a mathematical formula describing all or part of the surface. The model can be a theoretical model, and/or may be based on a mathematical model. The model may be available prior to treating the surface.

The model may comprise path data. Path data may comprise three-dimensional coordinates of the locations of a path of the tool. The path may be determined by theoretical considerations. The model may further comprise data indicating the order of the locations along the path. All or part of the path of the tool may be stored.

The path data may comprise velocities at locations along the path and/or values of a treatment parameter at locations along the path.

The model may be used to determine, in step (d), a direction and/or a velocity and/or a path and/or a value for a treatment parameter which is/are applied after the sequence of steps (a) to (d) or of steps (a) and (b) has been carried out one or more times subsequently to the determination.

Applying the determined direction and/or the velocity and/or the path and/or the value for a treatment parameter may comprise using the direction and/or the velocity and/or the path in step (a) and/or using the value for the treatment parameter in step (b).

The model may be based on path data.

The path data may comprise three-dimensional coordinates of locations along a path of the tool. The path data may further comprise data of velocities and/or of directions and/or of values of a treatment parameter. These data may correspond to the coordinates of locations along a path.

The path data may be specified in a coordinate system where two coordinates, in particular, an x and a y-coordinate, describe a location on a support plate of the CNC machine, and a third coordinate, in particular, a z-coordinate, describes the distance of a location from the support plate of the CNC machine. In particular, the coordinate system may be orthogonal, such that an x-direction and a y-direction of the coordinate system are perpendicular to each other and are both parallel to a support plate of the CNC machine, and a z-direction is perpendicular to the x-direction and the y-direction.

Using a model based on path data spares the effort of providing a model of the surface prior to working on it. In addition, using a model of the surface based on path data has the advantage of representing the surface to be treated more exactly.

Step (d) may not be based on a theoretical and/or mathematical model of the surface. Alternatively or in addition, the model may be based on path data. The path data may refer to locations in at least a part of the surface. In particular, the model may be based on path data corresponding to locations within a predetermined distance from the current position of the tool.

The sequence of steps (a) to (d) may be carried out several times successively by the CNC machine. In step (d), determining a new direction and/or a new velocity and/or a new path and/or a new value for a treatment parameter may be based on one or more of the response values which have been obtained during carrying out the sequence of steps (a) to (d).

In particular, determining a new direction and/or a new velocity and/or a new path and/or a new value for a treatment parameter may be based on one particular response value which has been obtained before carrying out the sequence of steps (a) to (d) by a given amount of times directly before the determining.

If the tool has been moved to or beyond a predetermined borderline, the tool may be displaced by a predetermined distance and the new direction may be determined as the reverse of the previous direction.

The borderline may be an upper or lower limit for coordinates of locations on the surface. The borderline may be represented by a line, which may be described by a mathematical equation. The borderline may be represented by limitations of a space described by an equation. The borderline may also be represented by a set of locations on a line or surface limiting the region where the tool may be moved in.

If the tool has arrived at a predetermined borderline, then the new path may be parallel to the path which the tool has followed until arriving at the borderline, but displaced by a predetermined distance. The tool may be moved along the new path in the direction opposed to the direction in which the tool has been moved until reaching the borderline.

The direction of displacing the tool may be crosswise with respect to the direction in which the tool has reached the borderline, or may be perpendicular with respect to that direction, or may be into the direction of the borderline.

The tool may be moved between at least two predetermined borderlines. In this case, the tool may be moved along parallel paths between the borderlines, where the parallel paths are separated by a displacement applied to the tool when the tool has reached the borderline.

Step (d) may be based on path data which have been determined while the tool has been moved, by the CNC machine, along a first path which may be close to the current path of the tool, in particular, parallel to the current path. In this way, the CNC machine moving the tool to a particular region may have a possibility to consider parameters which had been selected under conditions at a location which may be close to the region where the tool is moved towards.

Step (c) may comprise providing, by the sensor unit, data indicating a deflection of the tool and/or indicating a force experienced by the tool when treating the surface, in particular, experienced in response to an impact of the tool to the surface.

The sensor unit may comprise a distance sensor and/or a deformation sensor and/or a deflection sensor and/or a force sensor. There may be one or more sensors employed to carry out the invention.

In particular, a plurality of at least three sensors may be arranged to sense an effect in three different directions, in particular, wherein the sensors are arranged in three directions perpendicular to each other.

Step (c) may comprise providing, by the sensor unit, data indicating deflections in one direction only, and/or providing data indicating forces in one direction only. Step (c) may comprise providing, by the sensor unit, data indicating deflections in at least three different directions, in particular, in directions perpendicular to each other, and/or providing data indicating forces in at least three different directions, in particular, directions perpendicular to each other. The force experienced by the tool may be caused, at least in part, by pressing the tool to the surface.

The force experienced by the tool may be a counteracting force to a force applied by the tool to the surface. In particular, the force experienced by the tool may be a response to an impact of the tool to the surface.

The deflections of the tool may be determined in relation to a coordinate system fixed to a component of the CNC machine.

Step (c) may comprise providing, by the sensor unit, data for determining an elasticity value of the surface.

The elasticity value may be the modulus of elasticity (Young's modulus). The elasticity value may be Hooke's constant, or may represent a balk modulus or a shear modulus, as found, in particular, in Hooke's law for isotropic media.

A treatment parameter may be one of a force, a frequency or a time delay of the treatment to be performed by the tool, or a distance between the tool and the surface.

The force may indicate the force by which the tool presses to the surface, or the normal component of the force by which the tool presses to the surface. The force may be the force exerted on the tool to enable it to treat the surface. The force may be caused by an actuator influencing the tool. Alternatively or in addition, the force may be caused by trying to move the tool in a direction towards the surface when the tool already touches the surface. The frequency may be a measure of how often the tool touches the surface in a given time interval. The time delay may be the time interval between the moment when the tool starts to move towards the surface and the moment when it touches the surface. The time delay may also be the time interval between touching the surfaces two times subsequently by the tool. There may be more than one treatment parameter.

The tool may be carried by a toolholder. The toolholder may be part of the CNC machine. It may be possible to insert the tool into the toolholder. The tool may comprise a guiding component which permits attaching the tool to the toolholder. The guiding component may move together with the tool when the tool treats the surface. The guiding component may be fixed to the toolholder or to another part of the CNC machine.

Step (a) may comprise that, while moving the tool, the tool may be in contact with the surface.

Treating the surface may comprise continuously exerting a force on the tool to press the tool to the surface. The force may be exerted on the tool by an actuator. The force exerted on the tool may be caused by an actuator, and/or by varying the velocity vector of the tool, i.e. by varying the velocity and/or the direction of movement of the tool over the surface. The direction of moving the tool over the surface may be varied by changing to a new path for moving the tool.

In particular, the tool may be in continuous contact with the surface.

Step (a) may comprise that, while moving the tool, the tool may not be in continuous contact with the surface, in particular, the tool may be at a fixed distance from the surface.

In particular, the tool may be moved over the surface only without contact to the surface.

The tool may be surrounded by a cylinder. The cylinder may have contact to the surface.

The cylinder may have continuous contact to the surface. The cylinder may ensure that the tool and/or the actuator of the tool has a fixed distance to the surface. The cylinder may act as a protection of the tool. The cylinder may act as a support for an actuator used for treating the surface by the tool, and/or as a support for the sensor unit Step (c) may comprise providing, by the sensor unit, data indicating a distance between the tool and the surface, in particular, the time interval between a time when the tool starts to be accelerated towards the surface and a time when the tool touches the surface. Data indicating the distance between the tool and the surface may be determined even at times when the tool may have contact to the surface, and/or in the case that the tool may be surrounded by the above-mentioned cylinder.

The force for treating the surface by the tool may be exerted on the tool by an actuator. The actuator may be one of an oscillating mechanical device, an ultrasonic oscillator, a device driven by an oscillating field, a device comprising a magnetic actuator, or any other system capable to transfer a vibration or an impact on the surface. The actuator may be comprised by the CNC machine. The actuator may be controlled by a sinusoidal signal.

Step (d) may comprise keeping the force which may be applied to the surface by the tool constant and/or within a predetermined tolerance range.

The force applied to the surface by the tool may also comprise a component which may be caused by moving the tool over the surface in a direction which has a component in the direction where the tool is driven by the actuator To keep the force applied to the surface constant or within a predetermined tolerance range, the force exerted on the tool by the actuator and a force component caused by pressing the tool to the surface by moving it in a direction which may not be perpendicular to the force exerted by the tool in response to being driven by an actuator may be adapted such that their sum remains constant and/or within the predetermined tolerance range.

The force which may be applied to the surface by the tool may comprise a component which may be exerted on the tool by an actuator. The force applied to the surface by the tool may also comprise a component which may be caused by pressing the tool to the surface by the CNC machine.

The force which may be kept constant and/or in a predetermined tolerance range may have a direction perpendicular to a tangential plane of the surface at a point where the tool touches the surface.

Treating the surface may comprise hammering onto the surface.

In this case, the tool may be a hammer. The hammer may be used to micro-forge the surface. The hammer may be carried by a toolholder. The toolholder may be part of the CNC machine. It may be possible to insert the hammer into the toolholder. The hammer may comprise a guiding component which permits attaching the hammer to the toolholder. The guiding component may support the motion of the hammer in the toolholder. The guiding component may move together with the hammer tool when the hammer treats the surface. The guiding tool may be fixed to the toolholder or another part of the CNC machine.

Treatment parameters for a hammer tool may be a force, a frequency and/or a time delay. The force parameter may indicate the force by which the hammer strikes the surface, or the normal component of the force by which the hammer strikes the surface. The force parameter may also be the force experienced by the hammer in response to striking the surface. The frequency parameter may be a measure of how often the hammer strikes the surface in a given time interval. The time delay parameter may be the time interval between the moment when the hammer starts to move towards the surface and the moment when it touches the surface. The time delay parameter may also be the time interval between touching the surfaces two times subsequently by the hammer.

The sensor unit may provide a time when the hammer starts moving towards the surface, and a time when the hammer touches the surface.

A force may be exerted by the hammer to the surface at a stroke of the hammer. The force by which the hammer is driven by the actuator to perform a stroke may be a treatment parameter. The treatment parameters may be determined such that, at the stroke of a hammer, the magnitude of the component of the force exerted on the surface by the hammer in the direction of the striking hammer remains within a tolerance range, in particular, remains constant, for a plurality of hammer strokes, in particular, of successive hammer strokes.

Alternatively, the treatment parameters may be determined such that, at the stroke of a hammer, the magnitude of the force component perpendicular to the surface at points where the hammer strikes remains within a tolerance range, in particular, remains constant for a plurality of hammer strokes, in particular, of successive hammer strokes.

The time interval in which the magnitude of the force component in the direction of the striking hammer or of the force component perpendicular to the surface at points where the hammer strikes remains within a tolerance interval may be larger than the time interval between two successive hammer strokes, in particular, 10000 times, 1000000 times or 1000000000 times larger.

A force may be exerted by the hammer to the surface while the hammer does not perform a stroke. The force by which is the hammer is driven between two hammer strokes by the actuator may be a treatment parameter. The treatment parameters may be determined such that, between two successive hammer strokes, the magnitude of the component of the force exerted on the surface by the hammer in the direction of the striking hammer remains within a tolerance range, in particular, remains constant.

Alternatively, the treatment parameters may be determined such that, between two successive hammer strokes, the magnitude of the component of the force exerted on the surface by the hammer in the direction perpendicular to the surface at the location where the hammer is in contact with the surface remains within a tolerance range, in particular, remains constant.

Determining appropriate treatment parameters may be achieved by selecting the direction and velocity of moving the hammer over the surface as well as selecting the force by which the hammer strikes such that the sum of all forces applied to the surface at a time when the hammer strikes remains within a tolerance interval, in particular, remains at a constant value.

Adaptation of the force by which the hammer strikes to the surface may be based on information obtained at a preceding hammer stroke, in particular, at the directly preceding hammer stroke.

Step (b) may comprise pivoting the tool by the CNC-machine.

In this case, the treatment parameter may be an angle, in particular, an angle by which the tool may be pivoted.

The present disclosure further provides a CNC machine, which is configured to move a tool of a CNC machine over a surface, comprising:

a moving unit configured to move the tool in a predetermined direction and/or with a predetermined velocity and/or along a predetermined path, a treatment unit configured to treat the surface by the tool in accordance with a predetermined value of a treatment parameter, a sensor unit configured to determine a response value indicating a response of the tool to treating the surface and/or to being pressed to the surface, a decision unit configured to determine a new direction and/or a new velocity and/or a new path and/or a new value for the treatment parameter based on the response value.

The CNC machine may be a robot.

In addition, the present disclosure provides a CNC machine controller, configured to carry out the above-mentioned methods.

The CNC machine controller may be the controller of a robot.

The present disclosure also provides a computer program product, comprising one or more media readable by a CNC machine, carrying instructions thereon for performing the steps of the above-mentioned methods when run by the CNC machine.

The media may be readable by a robot, carrying instructions thereon for performing the steps of the above-mentioned methods when run by the robot.

Further aspects of the present disclosure will be described below with reference to the attached figures.

BRIEF DESCRIPTION OF THE DRAWINGS

FIG. 2 schematically illustrates an example embodiment of a machining unit in accordance with the present disclosure;

FIG. 3 illustrates an exemplary arrangement of sensors in a sensor unit according to the present disclosure in a schematic way;

DETAILED DESCRIPTION

Exemplary embodiments according to the present disclosure are described in the following. In particular, the tool which is moved by a CNC machine is described as being a hammer in some embodiments. However, the invention is not limited to be applied to the tool being a hammer, nor is the invention limited to the described examples.

Figure 1:
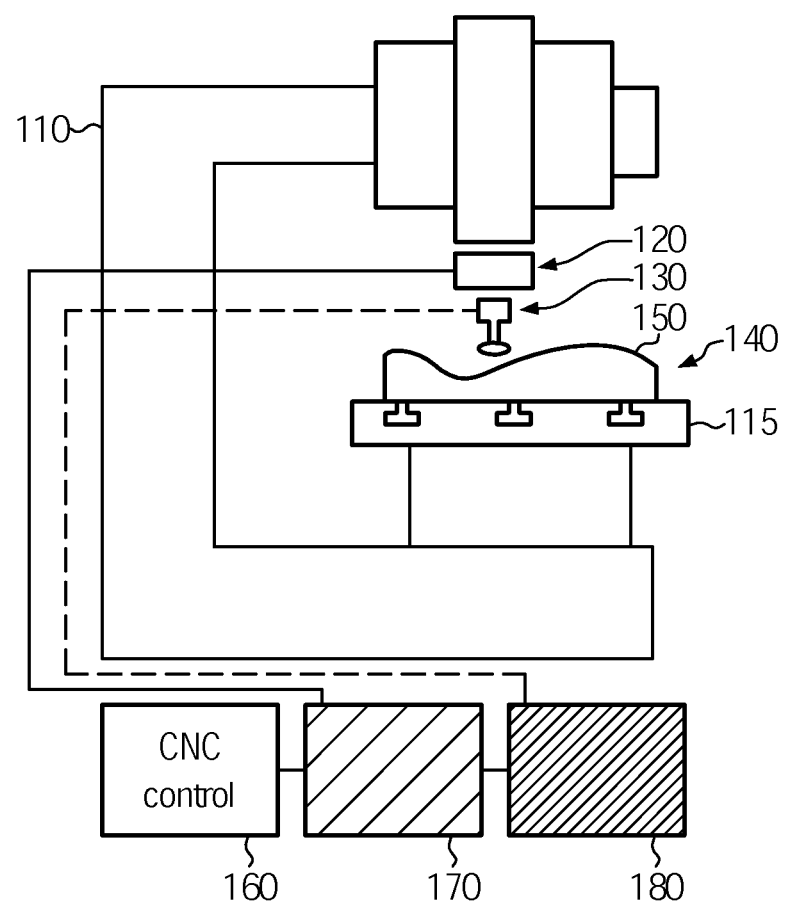
FIG. 1 illustrates an exemplary embodiment of a CNC machine in accordance with the present disclosure in a schematic way.

FIG. 1 illustrates an embodiment of a CNC machine in accordance with the present disclosure. The body 110 of the CNC machine comprises a stage 115 where a part 140 to be treated is mounted. The CNC machine is used to work on the surface 150 of the part 140.

The CNC machine also comprises a machining unit 120. The machining unit comprises a sensor unit of the CNC machine. The machining unit also comprises an actuator unit which carries the tool 130 which actually touches the surface 115 of the part 140 and performs work on the surface 115. The actuator unit may include a toolholder for carrying the tool 130.

The CNC machine moves the machining unit together with the tool over the surface of the part, while the tool treats the surface. In a particular embodiment, the tool is a hammer, and the CNC machine moves the hammer up and down to perform hammering on the surface.

To enable the CNC machine to perform its task, the CNC machine executes a CNC control program 160. The control program enables the CNC machine to move the machining unit carrying the tool over the surface. The CNC control program may use a mathematical description of the surface to determine the way of moving the tool. The mathematical description of the surface may have been determined based on the expected form of the part to be treated and may have been loaded into a storage of the CNC machine prior to actually working on the part. The CNC machine may also use a model of the surface to determine the way of moving the tool, where the model may be built by the CNC machine based on data obtained by the CNC machine while the tool is moved over the surface.

In an embodiment of the present disclosure, the CNC machine also comprises a sensor unit control 170. The sensor unit control receives data from sensors comprised in a sensor unit, which is part of the machining unit 120. The sensor unit may comprise sensors for measuring forces as well as for measuring deflections. The sensor unit may also comprise sensors for measuring distances. In this way, the sensor unit may provide, by using its sensors, information about the position and orientation of the tool 130, e.g., a hammer, with respect to the surface of the part. Moreover, the sensor unit may also provide information about the forces acting on the tool 130. If the tool is a hammer, the sensors in the sensor unit may provide measurement values comprising information about the force of thrusting down the hammer onto the surface, as well as about the reaction force experienced by the hammer in response to striking the surface.

The sensor unit control 170 of the CNC machine receives data based on the measurements of the sensors in the sensor unit. The sensor unit control 170 may also receive information about the time when a sensor has acquired data. In this way, information about the force exerted by the CNC machine to the part 140 (i.e. the "machining force") at a given location may be derived by the sensor unit control 170. In particular, the sensor unit in the machining unit 120 may comprise sensors for measuring forces exerted into different directions, in particular, into at least three different directions. The sensor unit in the machining unit 120 may also comprise sensors for measuring deflections into different directions, in particular, into at least three different directions. Based on the information provided by the sensor unit, the sensor control unit 170 may be enabled to reconstruct the orientation of the surface, i.e. derive a three-dimensional vector normal to the surface, at a point where the surface is touched by the tool 130.

The tool 130 attached to the machining unit 120 may be moved by an actuator which is part of the machining unit. In particular, the actuator may exert a force on the tool to press it down onto the surface. The actuator may be controlled by the actuator control 180 comprised in the CNC machine. The actuator control 180 may be employed by the CNC machine to control the force which is exerted onto a given point of the surface by means of the tool 130 carried by a toolholder in the machining unit. In the case of the tool 130 being a hammer, the actuator control may determine the velocity and/or the force by which the hammer hammers onto the surface 150.

As the CNC machine comprises the CNC control 160 as well as the sensor unit control 170 and the actuator control 180, the CNC machine may control the direction and velocity of moving the tool 130 based on information provided by the sensor control unit 170, in particular, information referring to the orientation and/or the force by which the surface is treated. Based on this information, the CNC machine may adapt the effect of the tool 130 by controlling the tool 130 by means of the actuator control 180.

The system comprising the CNC machine, the machining unit 120 and the tool 130 may be calibrated such that there is a known relation between the values provided by the sensor unit, the position of the tool 130 and the forces applied to the tool 130.

FIG. 2 illustrates an embodiment of a machining unit 120 comprising a hammer used in place of tool 130 in FIG. 1. Attached to the body 110 of the CNC machine is its machining unit 120, which comprises a sensor unit 220 and an actuator unit 230. An exemplary sensor unit 220 is described in WO 88/05524, which is hereby incorporated by reference in its entirety.

The actuator unit 230 may be one of an oscillating mechanical device, an ultrasonic oscillator, a device driven by an oscillating field, a device comprising a magnetic actuator or any other system capable to transfer a vibration or an impact on the surface.

A hammer 240 is attached to the actuator unit 230. The actuator unit 230 may comprise a toolholder for carrying the hammer. Moreover, the hammer may comprise a guiding component which allows inserting it into the toolholder or the actuator unit. Below the hammer is the surface 150 of the part 140 to be treated.

During operation of the CNC machine, the hammer may be moved with continuous contact to the surface, as illustrated by FIG. 2a, or the hammer 240 may be lifted above the surface and may be hammered down to the surface from time to time, thus being in touch with the surface only part of the time while the hammer 240 treats the surface, as is illustrated by FIG. 2b.

The exemplary sensor unit of this embodiment comprises at least one deflection sensor 250. The at least one deflection sensor 250 is configured to measure deflections of the hammer 240 with respect to the body 110 of the CNC machine. The deflections may be measured between the tip of the hammer 240 and the upper edge of the machining unit 120 where it is connected rigidly to the body 110 of the CNC machine, or with respect to another point of the body 110 of the CNC machine or of that part of the sensor unit 220 which is rigidly connected to the body 110. The at least one deflection sensor 250, on detecting a deflection, issues a corresponding signal which is forwarded, preferably in a processed form, to the sensor control unit 170. The at least one deflection sensor 250 may be a distance and/or deformation sensor. The deflection sensor may be based on springs, in particular, on leaf springs and/or on dampers.

The exemplary sensor unit of this embodiment also comprises at least one force sensor 260. The force sensor 260 is configured to be sensitive to forces between the part of the sensor unit 220 which is connected to the actuator 230, and the part of the sensor unit 220 which is connected to the body 110 of the CNC machine. The force sensor 260, on detecting a force, issues a corresponding signal which is forwarded, preferably in a processed form, to the sensor control unit 170. The at least one force sensor may be based on determining deformations and/or the change of distances, in particular by using springs and dampers.

FIG. 3 illustrates an example of an embodiment with an arrangement of sensors which are capable to sense the magnitude of deflections of a test object 310 as well as forces exerted on the test object. Such an arrangement of sensors may be comprised in the sensor unit 220. The test object 310 may be a component of the actuator 230 or of the tool 130.

In the exemplary arrangement of FIG. 3, three deflection sensors 320, 340 and 360 are attached to the test object 310. The sensors are arranged such that a deflection of the test object and/or of part of the test object can be detected in three directions which are perpendicular to each other, i.e. in three Cartesian directions. If the test object is deflected in any direction, for example, bent or shifted, then the components of the deflection projected onto each of the three directions corresponding to the orientation of the deflection sensors are sensed by the respective sensor.

In the embodiment of FIG. 3, three force sensors 330, 350 and 370 are attached to the test object 310 as well. The force sensors are arranged such that the vector of any force applied to the test object 310 can be detected. In particular, the force sensors may be arranged in three directions which are perpendicular to each other, i.e. in three Cartesian directions.

In another embodiment, three distance sensors are employed to sense deviations of the test object from its theoretical position. The distance sensors may be arranged such that the distance between the test object and each of the sensors can be sensed, wherein each of the three sensors senses the distance between the test object and the sensor along a different direction and the three directions along which the distance is measured are linearly independent. In particular, the three sensors may be placed on a support base in positions which are mutually offset by 120 degrees against each other. Such an arrangement of sensors and its usage is illustrated in more detail in WO 2004/033147, which is hereby incorporated by reference in its entirety.

If a force is applied to the test object in any direction, then the components of the applied force projected onto each of the three directions of the force sensors are sensed by the respective force sensor.

The force sensors as well as the deflection sensors may be comprise distance and/or deformation sensors. The force as well as the deflection sensors may be based on determining the behaviour of springs and/or dampers.

The system comprising the sensor unit control 170, the machining unit 120 and the tool 130 may be calibrated in such a way that the relation between the effects detected by the sensors in the sensor unit 220 and the position of the tool 1130 as well as the force experienced by the tool is known.

In the embodiment described in the following with respect to FIG. 4, the tool 130 is moved in continuous contact with the surface 150. In this embodiment, the tool is moved over the surface while, a constant basis force $D_0$ 420 normal to the surface 150 is exerted on the surface.

The basis force $D_0$ 420 may be caused by pressing the tool onto the surface by means of the actuator (for example, if the tool is a hammer, by causing to actuator to strike the hammer down), and/or by moving the machining unit 120 closer to the surface. By moving the machining unit 120, which includes the sensor unit 220, closer to the surface, the force exerted by the tool 130 to the surface 150 may increase due to elastic forces effected by springs in the machining unit 120, in particular, in the sensor unit 220. The springs may be strain gauges, comprised in at least a part of the sensors.

Figure 4A:
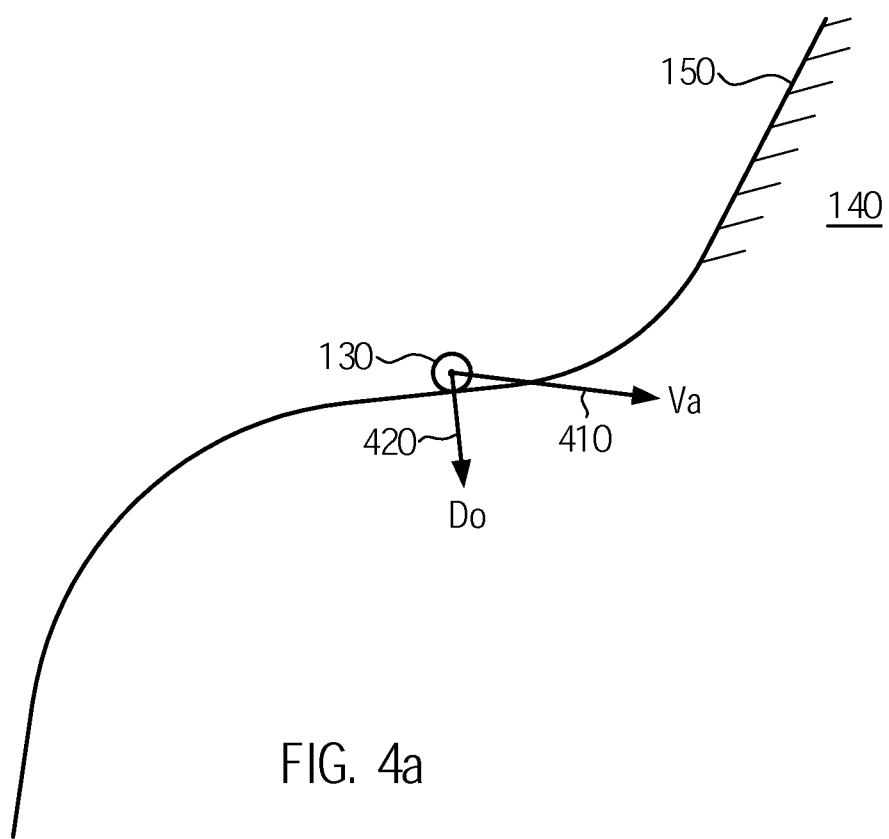
FIG. 4 schematically illustrates, in an exemplary way, the variation of the force exerted onto the surface by the tool with varying direction of movement of the tool.

The tool 130 may be moved with a moving velocity vector $V_a$ 410, which is illustrated in FIG. 4a. As a result from the direction of moving the tool with velocity $V_a$ 410, which is not directed in a direction tangential to the surface 150 at the point where the tool touches the surface, the basis force vector $D_0$ 420 may be exerted by the tool onto the surface in a direction perpendicular to the surface, i.e. perpendicular to the tangential plane of the surface at the point where the tool touches the surface.

Figure 4B:
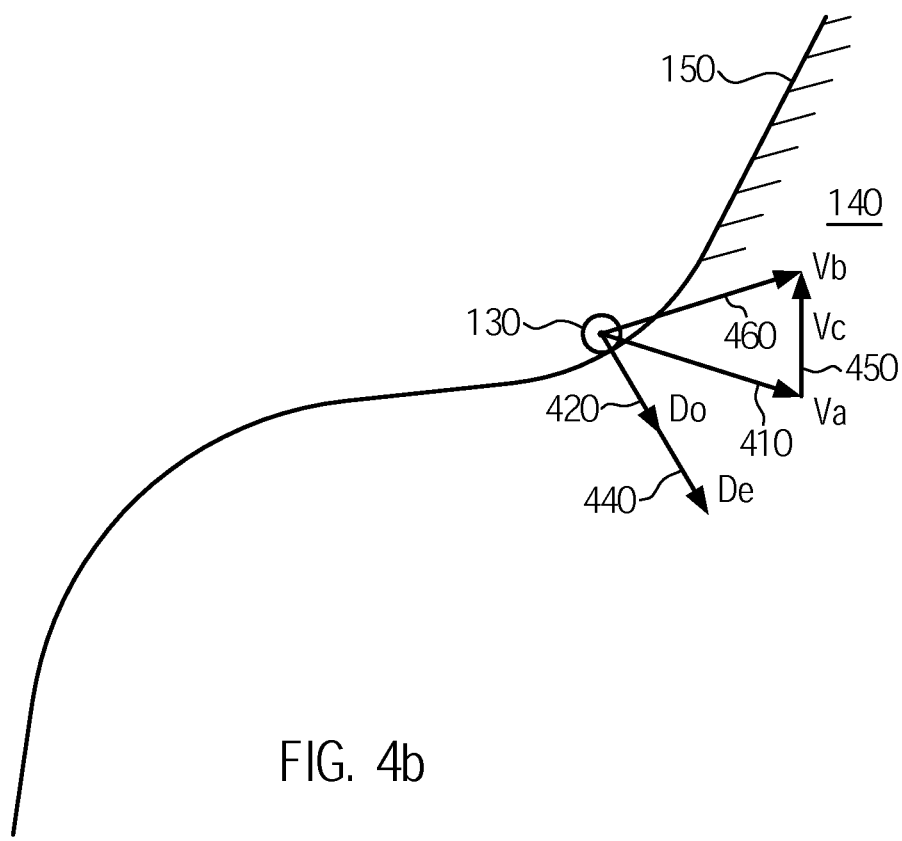

If the tool is moved forward while the surface is inclining, the situation illustrated by FIG. 4b will be reached. Here, the moving velocity vector $V_a$ 410 has an angle with respect to the direction tangential to the surface which is different from that in FIG. 4a. Hence, the moving velocity vector $V_a$ 410 has a different component in the direction perpendicular to the surface at the point where the tool touches the surface. This different component may have the effect that the tool 430 is pressed to the surface with an additional force component $D_e$ 440 normal to the surface, i.e. a deflection error force $D_e$ 440 may be added to the basis force $D_0$ 420 by moving the tool over the surface in a particular direction.

So, to keep the basis force at the desired level, the moving velocity vector $V_a$ 410 may have to be changed by a correction vector $V_c$ 450 to result in a new moving velocity vector $V_b$ 460, which may be determined such that the deflection error force $D_e$ vanishes. By repeatedly applying an appropriate correction vector $V_c$ to the respective moving velocity vector $V_a$, the tool may be moved over a surface with a variety of inclining and declining areas, while the force exerted by the tool perpendicular to the surface remains at the desired magnitude $D_0$ of the basis force.

In an embodiment of the present disclosure, a model describing the surface to be treated may be stored in the CNC machine. The model may be theoretical model based on mathematical considerations. Based on the model, a path for moving a tool over the surface may be predetermined prior to actually working on the surface. Alternatively or in addition, the model may be based on data obtained from the sensor unit while the tool is moved over the surface.

In particular embodiments, the tool may be a hammer. The movement of the hammer may be based on a predetermined path. The sensor unit 120 may have the ability to sense the counteracting force experienced by the hammer in the direction of the hammer strokes. Corresponding signals are forwarded from the sensor unit 120 to the sensor unit control 170. From this information, the CNC machine may determine the magnitude of the force exerted in the direction of the hammer strokes. In particular, the CNC machine may determine whether the force exerted in the direction of the hammer strokes between the hammer strokes is, within a tolerance limit, as high as a desired basis force. To change the force in the direction of the hammer strokes, the CNC machine may change the amount of the velocity and/or the direction of movement of the hammer such that the desired magnitude of the basis force is reached within a given tolerance range. This may be achieved by adapting the amount and/or direction of the driving velocity to get rid of a deflection error force as described above. By doing this, the CNC machine may deviate from the predetermined path to ensure that a basis force within a tolerance range, in particular, a constant basis force is exerted by the hammer onto the surface between two hammer strokes. In the same way, it may be ensured that the force with which the hammer strikes to the surface remains at a desired force level for all hammer strokes during treating the surface.

If the direction of movement of the hammer over the surface is not perpendicular to the direction of the hammer strokes, then the force exerted to move the hammer over the surface has a component in the direction of the hammer strokes. Accordingly, the force of the hammer strokes may be adapted such that the magnitude of a force sum being the sum of the force by which the hammer is driven and the force component, directed in the direction of the hammer stroke, which is caused by moving the hammer over the surface, may be kept within a predefined tolerance limit during working on the part.

To achieve this, the force by which the hammer is driven, in particular, by an actuator, and/or the velocity of movement and/or on the direction of movement of the hammer over the surface may be determined such that the magnitude of the force sum is kept within a predefined tolerance range.

Alternatively, the force by which the hammer is driven, in particular, by an actuator, and/or the velocity of movement and/or the direction of movement of the hammer over the surface may be determined such that the magnitude of the force sum is kept within a predefined tolerance range. Alternatively, the component of the force sum which is perpendicular to the surface at the point where the hammer is in contact with the surface may be kept within a predefined tolerance range.

In this way, it may be ensured that, at the time the hammer strikes to the surface, the force exerted on the surface in the direction of the hammer stroke is kept within a given tolerance range, or the force component exerted on the surface in a direction perpendicular to the surface at the point where the stroke hits is kept within a given tolerance range.

A forming device with a tool being arranged to direct a hammering impact effect of essentially ultrasonic frequency at the surface of a workpiece is disclosed by WO 2007/060284, which is hereby incorporated by reference in its entirety. Driving tools by ultrasonic sound is discussed in "Michael Schneeweiß: "Entwicklung zur ultraschallunterstützten Bearbeitung—Zwei neue Projekte am IfP," which is hereby incorporated by reference in its entirety. Furthermore, DE 102 43 415 A1, which is hereby incorporated by reference in its entirety, discloses a method for generating internal compressive stress in the surface of a part, where a similar device to that discussed by Schneeweiß is used which performs impact to a surface of a part with ultrasonic frequency.

In another embodiment, the sensor unit 220 has the ability to sense the counteracting forces and deflections experienced by the hammer in three direction perpendicular to each other. Corresponding signals are forwarded from the sensor unit 220 to the sensor control unit 170. From this information, the CNC machine determines the angle between the direction of a hammer stroke and the surface 150 of the part 140 to be treated. Based on this angle, the force of the hammer stroke is adjusted such that the component of that force which is perpendicular to the surface is kept constant within a predetermined tolerance limit. Adjusting the force of the hammer stroke may include adapting the force by which the hammer is thrust down by the actuator and/or the velocity of movement of the hammer and/or the direction of movement of the hammer over the surface.

Alternatively or in addition, the force vector of the hammer stroke may be adjusted by pivoting the hammer. Pivoting the hammer may include pivoting an actuator which drives the hammer. Then, the direction of the hammer stroke may be changed to a new direction in which the hammer is guided by an actuator. In particular, the hammer may be pivoted such that a hammer stroke can be performed in a direction which is expected to be perpendicular to the surface of a part to be treated at a particular hammer stroke, in particular, at the next hammer stroke which is to be performed. An angle by which the hammer is pivoted may be based on the above-mentioned angle determined by the CNC machine between the direction of a hammer stroke and the surface of the part which is treated.

The direction of movement may be based on a predetermined path which may be based on a mathematical model of the surface 150 of the part 140 to be treated. To adjust the force of the hammer stroke, in particular, by adapting the direction of velocity of movement for that purpose, the path of the hammer may deviate from the predetermined path.

The velocity and/or direction of movement of the tool over the surface and/or the value of the treatment parameter of the tool, in particular, the force by which a hammer tool is thrust down, at locations along the path of the tool may be stored, together with the coordinates of locations of the tool along the path.

In particular embodiments, the CNC machine may have access to a model of the surface. The model of the surface may be a description of the shape of the surface. The description may be based on mathematical expressions and/or on stored values. In particular, the model may be based on all or part of the above-mentioned values stored together with coordinates of locations of the tool along a path. The model may be predetermined, or may be derived from measurement carried out while the tool is moved over the surface.

If the CNC machine has access to a model of the surface, once step (d) has been carried out, the CNC machine may determine future expected locations of the tool, based on the determined new direction and/or new velocity and/or new path by employing the model.

Based on the model, the CNC machine may determine expected treatment parameters corresponding to expected future locations. In this way, the CNC machine may determine treatment parameters corresponding to locations on the surface where the tool is expected to be localized in the future.

Thus, the CNC machine may realize a look ahead functionality.

In particular, a CNC machine may determine values for treatment parameters which are planned to be applied after the CNC machine has carried out the method according to the present disclosure several more times, in particular, more than one more time. Determining values for treatment parameters may be based on a model of the surface and/or on rules for treating the surface which are available to the controller 160 of the CNC machine 110.

Rules for treating the surface may comprise changing a sign if the inclination of the surface has changed. Another treatment rule may comprise reducing a force of the treatment near a corner and/or an edge.

The CNC machine may provide an estimate of the velocity and/or direction of movement and/or the value of the treatment parameter to be chosen at a future expected location.

The CNC machine may provide, in particular, an estimate of directions of movement to be chosen at future locations of the tool. Moreover, the CNC machine may, in particular, provide an estimate of the deviation from a predetermined path, in particular, from a predetermined path which may be based on a predetermined model.

This look ahead functionality may be particularly useful in the proximity of geometry changes, i.e. in the proximity of changes of angles between the hammer and the surface, in particular, near sharp corners. In the proximity of geometry changes, it may be particularly useful to have an estimate at hand for the location where the tool is expected to be moved to, as a small deviation of the tool from a predetermined point may result in large variations in the direction and velocity of movement as well as with respect to treatment parameters according to which the tool has to treat the surface at such locations.

In another embodiment, the sensor unit has the ability to sense the counteracting forces and deflections experienced by the tool in three direction perpendicular to each other. The tool can also move in at least three directions perpendicular to each other. The CNC machine initially does not have any information about the geometry of the surface to be treated. However, an initial direction of movement may be given as well as a closed borderline around an initial position of the tool, where the borderline limits the area where the tool may be moved in. The borderline may be described by a mathematical equation, or may be given by limits for coordinates of the tool. If the tool is moved to the borderline, then the direction of movement of the hammer may be inverted and the hammer may be displaced such that the tool, when being moved away from the borderline, follows a path which may be parallel and in a defined distance to the path where the tool has been moved towards the borderline. The displacement of the tool may be in the direction of the borderline, or perpendicular to the borderline. Following this method, a part of the surface which is surrounded by the borderline can be treated while no model of the surface is required prior to treating the surface, thus saving the time of programming the model of the surface as well as of establishing a predetermined path for moving the tool. The coordinates along a path of the tool 130 which has been determined while moving the tool 130 over the surface based on sensor data may be used as basis for a model of the actual surface 150 of the part 140.

In this embodiment, when the tool is moved back from the borderline, the tool may be moved along a path which is close, in particular, parallel to a path where it has already been moved along on its way to the borderline. Hence, data for velocity and/or direction of movement and/or data for the force by which the tool is thrust down may be stored by the CNC machine for positions of the hammer along the path to the borderline, in particular, for the whole path between two times of reaching the borderline. When the tool is moved on its way back from the borderline, then the CNC machine may use the data of a path to the borderline stored before for determining the new path. Data of positions of the tool for every path from borderline to borderline may be stored. The stored data may be used as a basis for a model of the actual surface.

So, a CNC machine performing a method according to the present disclosure may perform treating edges and/or corners by determining expected treatment parameters for future expected locations even if no model of the surface is available at the CNC machine prior to working on the surface. At the end of treating the surface, the entire area delimited by the borderline has been treated. Hence, a model of the actual shape of the surface in the entire area may be available.

On a path in an area where no associated data is stored which may serve as a basis for a model, the velocity of movement and/or the force by which the tool is thrust down may be reduced for careful working on the surface.

In one embodiment, the tool may not be in continuous contact with the surface 150 of the part 140 to be treated. Instead, the tool is away from the surface by a distance. In this case, the distance between the tool and the surface is controlled by the CNC machine. The distance between tool and surface may have to be large enough to allow the tool to accelerate to a required thrust velocity permitting the tool to touch the surface with a desired force. An actuator may be used to accelerate the tool and/or to apply force onto the surface. The optimum distance for a correct acceleration and/or a correct force applied to the surface may be dependent on the orientation of the surface 150 with respect to the tool 240.

Figure 5:
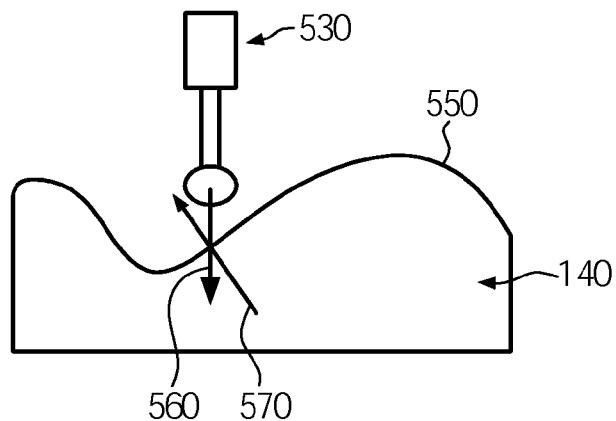
FIG. 5 schematically illustrates an example where the counteracting force experienced by a hammer tool is not directed into the direction of a hammering stroke.

The tool may be carried by an actuator which may be attached to a sensor unit. The sensor unit may comprise deflection sensors and/or force sensors which are configured to sense deflections and/or forces applied to the tool into three different directions which may be perpendicular to each other. FIG. 5 illustrates the exemplary configuration of a hammer as the tool 530 hovering over the surface 550 of a part 140 to be treated by the hammer. The hammer is thrust down onto the surface 550 with a force 560 and accelerates into this direction. When it reaches the surface 550, it experiences the counteracting force 570 which is directed normal to the surface at the touching point. The counteracting force 570 may be, in general, not directed into the direction in which the hammer thrusts down onto the surface. The direction of the counteracting force 570 depends on the angle between the direction 560 in which the hammer thrusts onto the surface and a tangential plane to the surface at the point where the hammer touches the surface. The sensor unit 220 measures the counteracting force and/or a deflection applied to the hammer. The magnitude of the counteracting force can be derived from the sensor output by the CNC machine. Based on the magnitude of the counteracting force 570, the CNC machine may adapt the distance between the hammer 530 and the surface 550 such that the hammer has enough space left to accelerate to strike the surface with the desired force. In addition or instead, the force applied to the hammer 530 by the actuator may be varied in dependence on the magnitude of the counteracting force.

Figure 6:
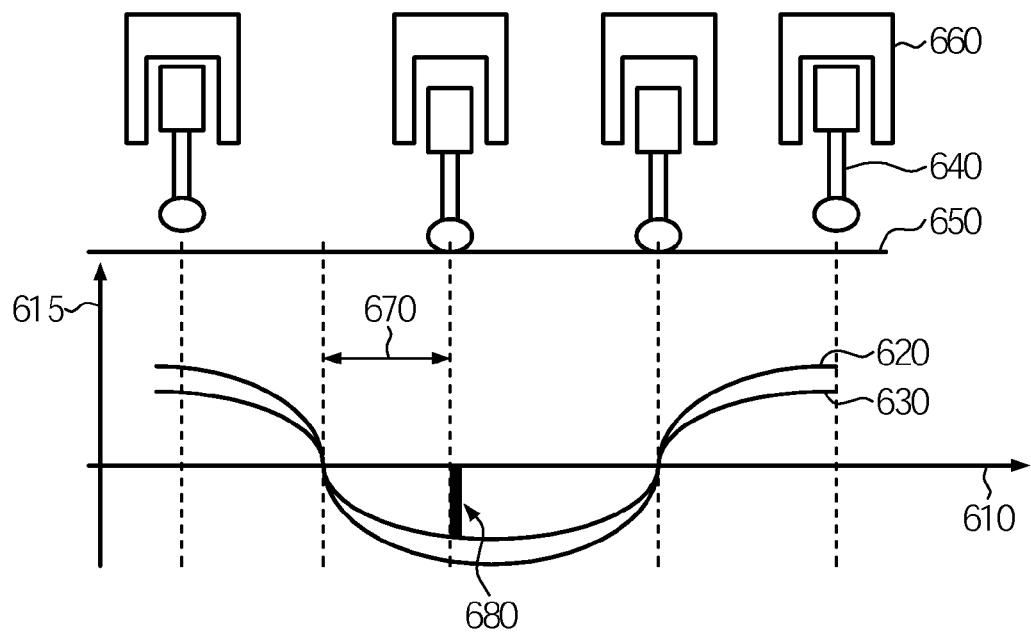
FIG. 6 schematically illustrates, in an exemplary way, a method of controlling the impact of a hammer onto a surface by measuring the time interval according to the present disclosure.

FIG. 6 illustrates the situation where an actuator 660 is driven by an actuator control signal 620 indicating the force exerted on a hammer 640 by the actuator 660 over time. The time is indicated along the x-axis 610 of the figure, and the y-axis of the figure indicates a force 615. The line 630 describes the force by which the hammer 640 strikes the surface 650 after the time given on the x-axis 610. The line 630 describes the force which is theoretically applied if the stroke occurs under optimal conditions, in particular, where the stroke hits perpendicular to the surface 650 and where the hammer started at an optimal distance from the surface.

The actual impact force 680 may be measured by a sensor. Alternatively or in addition, the length of the time interval 670 between the start of accelerating the hammer 640 by the actuator 660 and its impact onto the surface 650 may be a measure for the impact force 680. Therefore, the CNC machine may control the length of the time interval 670 to control the force being exerted onto the surface 650. To achieve controlling the time interval 670, the CNC machine may adapt the distance between the actuator 660 and the surface 650 to vary the time interval over which the hammer is accelerated before the impact. To decrease the impact force 680, the distance between the actuator 660 and the surface 650 may be reduced. In this way the correct impact force for the actual surface orientation can be determined.

If the actuator 660 is operated with a frequency of some hundreds of actuator cycles per second, then some hundreds of time intervals 670 may be measured per second. Within each actuator cycle, a time interval 670 and the impact force 680 will be determined.

By taking into account the impact force in three different directions, in particular perpendicular to each other, the angle between the direction of a hammer stroke and the counteracting force exerted by the surface 650 may be derived. In this way, controlling the force applied to the surface by moving the machining unit with the hammer not in contact to the surface between hammer strokes and monitoring the time interval 670 between start of hammer acceleration and impact of the hammer may lead to the same hammering actions as controlling the force applied to the surface by moving the machining unit with the hammer in contact to the surface and measuring the forces and deflections exerted onto the hammer by the surface, as has been described above.

To control the direction in which a force is exerted to the surface 650, the hammer may be pivoted. Pivoting the hammer may include pivoting the actuator 660. The hammer may be pivoted by an angle which is based on the above-mentioned angle between the direction of the hammer stroke and the counteracting force exerted by the surface 650.

The embodiment where the tool is not in continuous contact to the surface, in particular, the embodiments illustrated by FIG. 6, may also comprise a sensor unit 220. The sensor unit may be attached to the actuator unit in the same way as described above with respect to FIG. 2. The sensor unit 220 may also be attached to the CNC machine 110 in the same way as described above with respect to FIG. 2. The sensor unit may be arranged like the examples described above, in particular as discussed in connection with FIG. 3.

Figure 7:
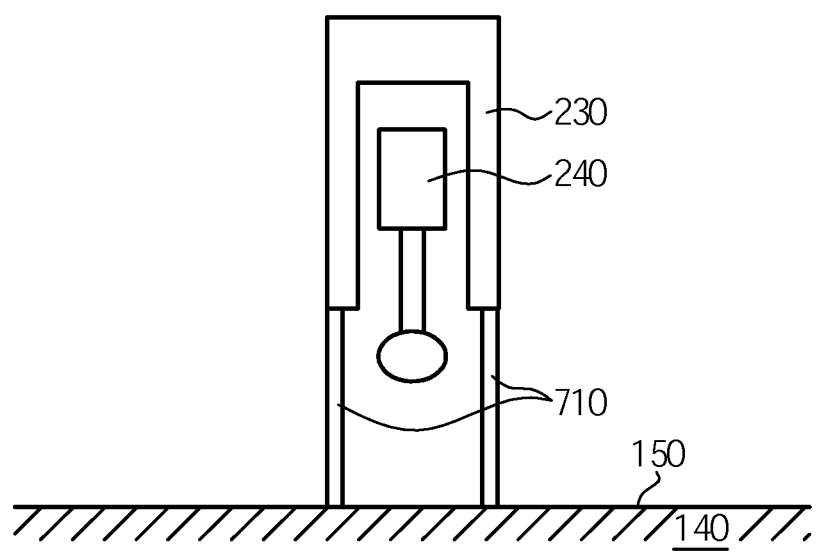
FIG. 7 illustrates an exemplary embodiment of the present disclosure where the distance between an actuator with a tool and the surface to be treated is kept at a minimum by a cylinder inserted between them.

In a particular embodiment, which is illustrated by FIG. 7, the tool 240 does not have continuous contact to the surface 150, but is surrounded by a cylinder 710 which has contact with the surface 150. The cylinder may exert only a minimal force, in particular, the weight of the cylinder, to the surface. The purpose of the cylinder is to maintain a minimum distance between the tool 240, in particular, a hammer, and the surface 150 of the part 140 to be treated.

In this embodiment, the actuator unit 230 is arranged such that it keeps contact with the cylinder 710, while the cylinder 710 keeps contact with the surface 150. The tool 240 is thrust towards the surface 150 by the actuator unit 230. The tool 240 may or may not touch the inner surface of the cylinder 710. By using the cylinder 710, it is possible that the actuator unit 230 may be moved, together with the tool 240 mounted on the actuator unit 230, over the surface 150 at a minimum distance from the surface corresponding to the height of the cylinder 710. In particular, the actuator unit 230 together with the mounted tool 240 may be moved at a constant distance from the surface corresponding to the height of the cylinder 710 during the treatment of the surface.

The embodiments where the tool is surrounded by a cylinder 710, in particular as illustrated by FIG. 7, may also comprise a sensor unit 220. The sensor unit may be attached to the actuator unit in the same way as described above with respect to FIG. 2. The sensor unit 220 may also be attached to the CNC machine 110 in the same way as described above with respect to FIG. 2. The sensor unit may be arranged like the examples described above, in particular as discussed in connection with FIG. 3.

In a further embodiment, the tool may be surrounded by a cylinder 710 like in the embodiments described with respect to FIG. 7, but the tool, in particular, a hammer, is moved over the surface of the part with continuous contact to the surface. In this case, the embodiment may also comprise a sensor unit 220. The sensor unit may be attached to the actuator unit in the same way as described above with respect to FIG. 2. The sensor unit 220 may also be attached to the CNC machine 110 in the same way as described above with respect to FIG. 2. The sensor unit may be arranged like the examples described above, in particular, as discussed in connection with FIG. 3.

By applying the cylinder surrounding the tool, the tool has protection against external influences. In addition, the cylinder may serve as support for the actuator and/or the sensor unit.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for moving a tool of a CNC machine over a surface, wherein the CNC machine is provided with a sensor unit, the method comprising the steps of:
   (a) driving the tool over the surface in a predetermined direction and/or along a predetermined path;
   (b) treating the surface by the tool in accordance with a predetermined value of a treatment parameter;
   (c) determining, by the sensor unit, a response value indicating a response of the tool to the treating of the surface, and deriving a model of the surface based on the response value, wherein the model describes a shape of at least a part of the surface and is derived from data obtained from the sensor unit while the tool is driven over the surface, the data comprising data indicating a deflection of the tool or a force experienced by the tool when treating the surface; and
   (d) determining a new direction and/or a new path based on the response value and on the model, and adapting the treating of the surface to working conditions which are encountered by the tool by changing direction of driving over the surface laterally with respect to the predetermined direction and/or the predetermined path, so as to treat the surface along a direction and/or a path that are/is different from the predetermined direction and/or path, such that a resulting treated path is different than the predetermined path.

2. The method according to claim 1 wherein the model is based on path data.

3. The method according to claim 1 wherein the model is used to determine, in step (d), a direction and/or a path which is/are applied after the sequence of steps (a) to (d) or of steps (a) and (b) has been carried out one or more times subsequently to the determination.

4. The method according to claim 3, wherein the model is based on path data.

5. The method according to claim 1, wherein, if the tool has been moved to or beyond a predetermined borderline, the tool is displaced by a predetermined distance and the new direction is determined as the reverse of the previous direction.

6. The method according to claim 5, wherein step (c) comprises providing, by the sensor unit, data indicating a force experienced by the tool in response to an impact of the tool to the surface.

7. The method according to claim 1, wherein the treatment parameter may be one of a force, a frequency or a time delay of the treatment to be performed by the tool.

8. The method according to claim 1, wherein step (a) comprises, while moving the tool, the tool is in contact with the surface.

9. The method according to claim 1, wherein step (a) comprises, while moving the tool, the tool is not in continuous contact to the surface.

10. The method according to claim 1, wherein step (a) comprises, while moving the tool, the tool is at a fixed distance from the surface.

11. The method according to claim 1, wherein the tool is surrounded by a cylinder that has contact to the surface.

12. The method according to claim 1 wherein step (d) comprises keeping force, which is applied to the surface by the tool, constant and/or within a predetermined tolerance range.

13. The method according to claim 1, wherein treating the surface comprises hammering onto the surface.

14. The method of claim 1 wherein the tool comprises a hammer, and the method comprises sensing by the sensor unit counteracting forces and deflections experienced by the hammer in three directions perpendicular to each other, and determining by the CNC machine an angle between a direction of a hammer stroke and the surface based on the sensed forces and deflections.

15. A CNC machine controller, configured to carry out the method of claim 1.

16. A computer program product, comprising one or more non-transitory media readable by a CNC machine, carrying instructions thereon for performing the steps of the method of claim 1 when run by the CNC machine.

17. A CNC machine, which is configured to move a tool over a surface, comprising:
   a driving unit configured to drive the tool in a predetermined direction and/or along a predetermined path;
   a treatment unit configured to treat the surface by the tool in accordance with a predetermined value of a treatment parameter;
   a sensor unit configured to determine a response value indicating a response of the tool to the treating of the surface, wherein the CNC machine is configured to derive a model of the surface based on the response value, and wherein the model describes a shape of at least a part of the surface and is derived from data obtained from the sensor unit while the tool is driven over the surface, the data comprising data indicating a deflection of the tool or a force experienced by the tool when treating the surface; and
   a decision unit configured to determine a new direction and/or a new path based on the response value and on the model, and to adapt the treatment of the surface to working conditions which are encountered by the tool by changing direction of driving over the surface laterally with respect to the predetermined direction and/or the predetermined path, so as to treat the surface along a direction and/or a path that are/is different from the predetermined direction and/or path, such that a resulting treated path is different than the predetermined path.

18. The CNC machine according to claim 17 wherein the tool comprises a hammer, and the driving unit is configured to receive the hammer and to move the hammer up and down to perform hammering on the surface.

19. The CNC machine according to claim 18 wherein the sensor unit is configured to sense counteracting forces and deflections experienced by the hammer in three directions perpendicular to each other, and the CNC machine is configured to determine an angle between a direction of a hammer stroke and the surface based on the sensed forces and deflections.

20. A method for moving a tool of a CNC machine over a surface, wherein the CNC machine is provided with a sensor unit, the method comprising the steps of:
  (a) driving the tool over the surface in a predetermined direction and/or along a predetermined path;
  (b) treating the surface by the tool in accordance with a predetermined value of a treatment parameter;
  (c) determining, by the sensor unit, a response value indicating a response of the tool to the treating of the surface, and deriving a model of the surface based on the response value, wherein the model describes a shape of at least a part of the surface and is derived from data obtained from the sensor unit while the tool is driven over the surface; and
  (d) determining a new direction and/or a new path based on the response value and on the model, and adapting the treating of the surface to working conditions which are encountered by the tool by changing direction of driving over the surface laterally with respect to the predetermined direction and/or the predetermined path, so as to treat the surface along a direction and/or a path that are/is different from the predetermined direction and/or path, such that a resulting treated path is different than the predetermined path;
    wherein the tool comprises a hammer, and the method comprises sensing by the sensor unit counteracting forces and deflections experienced by the hammer in three directions perpendicular to each other, and determining by the CNC machine an angle between a direction of a hammer stroke and the surface based on the sensed forces and deflections.

* * * * *